United States Patent
Herre et al.

(10) Patent No.: US 6,424,939 B1
(45) Date of Patent: Jul. 23, 2002

(54) METHOD FOR CODING AN AUDIO SIGNAL

(75) Inventors: Jürgen Herre, Buckenhof; Uwe Gbur, Berlin; Andreas Ehret, Nürnberg; Martin Dietz, Nürnberg; Bodo Teichmann, Nürnberg; Oliver Kunz, Sesslach; Karlheinz Brandenburg, Erlangen; Heinz Gerhauser, Waischenfeld, all of (DE)

(73) Assignee: Fraunhofer-Gesellschaft zur Forderung Der Angewandten Forschung E.V. (DE)

( * ) Notice: Subject to any disclaimer, the term of this patent is extended or adjusted under 35 U.S.C. 154(b) by 0 days.

(21) Appl. No.: 09/402,684

(22) PCT Filed: Mar. 13, 1998

(86) PCT No.: PCT/EP98/01481

§ 371 (c)(1),
(2), (4) Date: Oct. 6, 1999

(87) PCT Pub. No.: WO99/04506

PCT Pub. Date: Jan. 28, 1999

(30) Foreign Application Priority Data

Jul. 14, 1997 (DE) .......................................... 197 30 130

(51) Int. Cl.[7] .............................. G10L 19/00; H04B 1/66
(52) U.S. Cl. ......................... 704/219; 704/230; 704/500
(58) Field of Search ................................. 704/219, 220, 704/226, 227, 228, 230, 800

(56) References Cited

U.S. PATENT DOCUMENTS

| | | | |
|---|---|---|---|
| 4,805,193 A | 2/1989 | McLaughlin et al. | .......... 375/27 |
| 5,481,614 A | 1/1996 | Johnston | .......... 381/2 |
| 5,627,938 A | 5/1997 | Johnston | .......... 704/230 |
| 5,692,102 A | * 11/1997 | Pan | .......... 704/220 |
| 5,727,119 A | * 3/1998 | Davidson et al. | .......... 704/203 |
| 5,736,943 A | * 4/1998 | Herre et al. | .......... 341/50 |

(List continued on next page.)

FOREIGN PATENT DOCUMENTS

EP 0709981 A1 5/1996

OTHER PUBLICATIONS

Ashihara et al., "Separation of speech from noise by using linear prediction in frequency domain", Nov. 1995, Journal of the Acoustical Society of Japan.

Markel et al., "Linear Prediction of Speech", 1976, Springer–Verlag.

Bosi et al., "ISO/IEC MPEG–2 Advanced Audio Coding", Nov. 8–11, 1996, AES Presented at the 101st Convention Los Angeles, CA.

Herre et al., "Enhancing the Performance of Perceptual Audio Coders by Using Temporal Noise Shaping (TNS)", Nov. 8–11, 1996, AES presented at the 101st Convention Los Angeles, CA.

(List continued on next page.)

Primary Examiner—William Korzuch
Assistant Examiner—Susan McFadden
(74) Attorney, Agent, or Firm—Beyer Weaver & Thomas, LLP (57) ABSTRACT

A method for coding or decoding an audio signal combines the advantages of TNS processing and noise substitution. A time-discrete audio signal is initially transformed to the frequency domain in order to obtain spectral values of the temporal audio signal. Subsequently, a prediction of the spectral values in relation to frequency is carried out in order to obtain spectral residual values. Within the spectral residual values, areas are detected encompassing spectral residual values with noise properties. The spectral residual values in the noise areas are noise-substituted, whereupon information concerning the noise areas and noise substitution is incorporated into side information pertaining to a coded audio signal. Thus, considerable bit savings in case of transient signals can be achieved.

14 Claims, 7 Drawing Sheets

U.S. PATENT DOCUMENTS

| | | | | |
|---|---|---|---|---|
| 5,781,888 A | * | 7/1998 | Herre | 704/219 |
| 5,790,759 A | * | 8/1998 | Chen | 704/230 |
| 6,012,025 A | * | 1/2000 | Yin | 704/219 |
| RE36,714 E | * | 5/2000 | Brandenburg et al. | 704/227 |

OTHER PUBLICATIONS

D. Schulz, "Improving Codecs by Noise Substitution", Jul./Aug. 196. J. Audio Eng. Soc., vol. 44No. 7/8.

* cited by examiner

| INPUT SIGNAL | | OPTIMUM CODING | |
|---|---|---|---|
| TIME DOMAIN | FREQU. DOMAIN | DIRECT CODING | PREDICT. CODING |
| u(t) [sine wave] | U(f) [peak] | CODING OF SPECTRAL DATA | PREDICTION IN TIME DOMAIN |
| u(t) [peak] | U(f) [sine wave] | CODING OF TIME DOMAIN DATA | PREDICTION IN FREQUENCY DOMAIN |

METHOD FOR CODING AN AUDIO SIGNAL

FIELD OF THE INVENTION

The present invention relates to a method for coding audio signals, and in particular to a method for coding an audio signal for the standard MPEG-2 AAC being just developed.

BACKGROUND OF THE INVENTION AND PRIOR ART

The standardization organization ISO/IEC JTC1/SC29/WG11, which is also known as Moving Pictures Expert Group (MPEG), was founded in 1988 in order to specify digital video and audio coding schemes for low data rates. The first specification phase was completed in November 1992 by the standard MPEG-1. The audio coding system according to MPEG-1, which is specified in ISO 11172-3, operates in a single-channel or two-channel stereo mode at sampling frequencies of 32 kHz, 44.1 kHz and 48 kHz. The standard MPEG-1 Layer II delivers broadcasting quality, as specified by the International Telecommunication Union, at a data rate of 128 kb/s per channel.

In its second development phase, the aims of MPEG consisted in defining multi-channel extension for MPEG-1-Audio, which was supposed to be backward-compatible with respect to existing MPEG-1 systems, and in defining also an audio coding standard at lower sampling frequencies (16 kHz, 22.5 kHz, 24 kHz) than with MPEG-1. The backward-compatible standard (MPEG-2 BC) as well as the standard with lower sampling frequencies (MPEG-2 LSF) were completed in November 1994. MPEG-2 BC delivers a good audio quality at data rates from 640 to 896 kb/s for 5 channels with full bandwidth. Since 1994, further endeavors of the MPEG-2 audio standardization committee consist in defining a multi-channel standard of higher quality than that obtainable when backward compatibility to MPEG-1 is demanded. This not backward-compatible audio standard according to MPEG-2 is designated MPEG-2 NBC. The aim of this development consists in obtaining broadcasting qualities according to the ITU-R requirements at data rates of 384 kb/s or lower rates for 5-channel audio signals in which each channel has the full bandwidth. The audio coding standard MPEG-2 NBC was completed in April 1997. The scheme MPEG-2 NBC will constitute the core for the already planned audio standard MPEG-4 that will have higher data rates (above 40 kb/s per data channel). The NBC or not backward-compatible standard combines the coding efficiency of a high-resolution filter bank, prediction techniques and redundancy-reducing Huffman coding in order to obtain audio coding of broadcasting quality at very low data rates. The standard MPEG-2 NBC is also referred to as MPEG-2 NBC AAC (AAC=Advanced Audio Coding). A detailed representation of the technical contents of MPEG-2 AAC can be found in M. Bosi, K. Brandenburg, S. Quackenbush, L. Fielder, K. Akagiri, H. Fuchs, M. Dietz, J. Herre, G. Davidson, Yoshiaki Oikawa: "ISO/IEC MPEG-2 Advanced Audio Coding", 101st AES Convention, Los Angeles 1996, Preprint 4382.

Efficient audio coding methods remove both redundancies and irrelevancies from audio signals. Correlations between audio sampling values and statistics of sample value representation are exploited for removing redundancies. Frequency range and time range masking properties of the human hearing system are exploited in order to remove non-perceptible signal components (irrelevancies). The frequency content of the audio signal is subdivided into partial bands by means of a filter bank. The data rate reduction is achieved by quantizing the spectrum of the time signal in accordance with psycho-acoustic models, and this reduction may comprise a loss-free coding method.

Generally speaking, a time-continuous audio signal is sampled in order to obtain a time-discrete audio signal. The time-discrete audio signal is subjected to windowing by means of a window function in order to obtain successive blocks or frames of a specific number of, e.g. 1024, windowed time-discrete sampling values. Each block of windowed time-discrete sampling values of the audio signal is successively transformed to the frequency range, for which a modified discrete cosine transformation (MDCT) can be employed for example. The thus obtained spectral values are not yet quantized and thus need to be quantized. The main object in doing so consists in quantizing the spectral data in such a manner that the quantization noise is masked or covered by the quantized signals themselves. For doing so, a psycho-acoustic model described in the MPEG AAC standard is employed which, in consideration of the specific properties of the human ear, calculates masking thresholds depending on the audio signal present. The spectral values then are quantized in such a manner that the quantization noise introduced is hidden and thus becomes inaudible. Quantization thus does not result in audible noise.

The NBC standard makes use of a so-called non-uniform quantizer. In addition thereto, a method is used for shaping the quantization noise. The NBC method uses, just as preceding standards, the individual amplification of groups of spectral coefficients that are known as scale factor bands. In order to operate in as efficient manner as possible, it is desirable to be able to shape the quantization noise in units that are as far as possible matched to the frequency groups of the human hearing system. It is thus possible to group spectral values that very closely reflect the bandwidth of the frequency groups. Individual scale factor bands can be amplified by means of scale factors in steps of 1.5 dB. Noise shaping is achieved as amplified coefficients have higher amplitudes. Therefore, they will in general display a higher signal-to-noise ratio after quantization. On the other hand, higher amplitudes require more bits for coding, i.e. the bit distribution between the scale factor bands is changed implicitly. The amplification by the scale factors, of course, has to be corrected in the decoder. For this reason, the amplification information stored in the scale factors in units of 1.5 dB steps must be transmitted to the decoder as side information.

After quantization of the spectral values present in scale factor bands and optionally amplified by scale factors, the spectral values are to be coded. The input signal to a noise-free coding module thus is the set of, for example, 1024 quantized spectral coefficients. By means of the noise-free coding module, the sets of 1024 quantized spectral coefficients are divided into sections in such a manner that a single Huffman coding table ("codebook") is employed for coding each section. For reasons of coding efficiency, section limits can be present only on scale factor band limits, such that for each section of the spectrum both the length of the section in scale factor bands and the Huffman coding table number used for the section must be transmitted as side information.

The formation of the sections is dynamic and varies typically from block to block, such that the number of bits necessary for representing the full set of quantized spectral coefficients is reduced to a minimum. Huffman coding is used for representing n-tuples of quantized coefficients, with the Huffman Code being derived from one of 12 coding tables. The maximum absolute value of the quantized coefficients that can be represented by each Huffman coding table as well as the number of coefficients in each n-tuple for each coding table are defined from the very beginning.

The reason for forming the sections thus consists in grouping regions having the same signal statistics, in order to obtain an as high as possible coding gain for a section by means of one single Huffman coding table, with the coding gain being defined in general by the quotient of bits prior to coding and bits after coding. By means of a coding table number ("codebook number") defined in the bit flow syntax used for the NBC method, reference is made to one of the 12 Huffman coding tables which permits the highest coding gain for a specific section. The expression "coding table number" in the present application thus is to refer to the location in the bit flow syntax reserved for the coding table number. For coding 11 different coding table numbers in binary manner, there are required 4 bits. These 4 bits have to be transmitted as side information for each section, i.e. for each group of spectral values, so that the decoder is capable of selecting the corresponding correct coding table for decoding.

Figure 2:
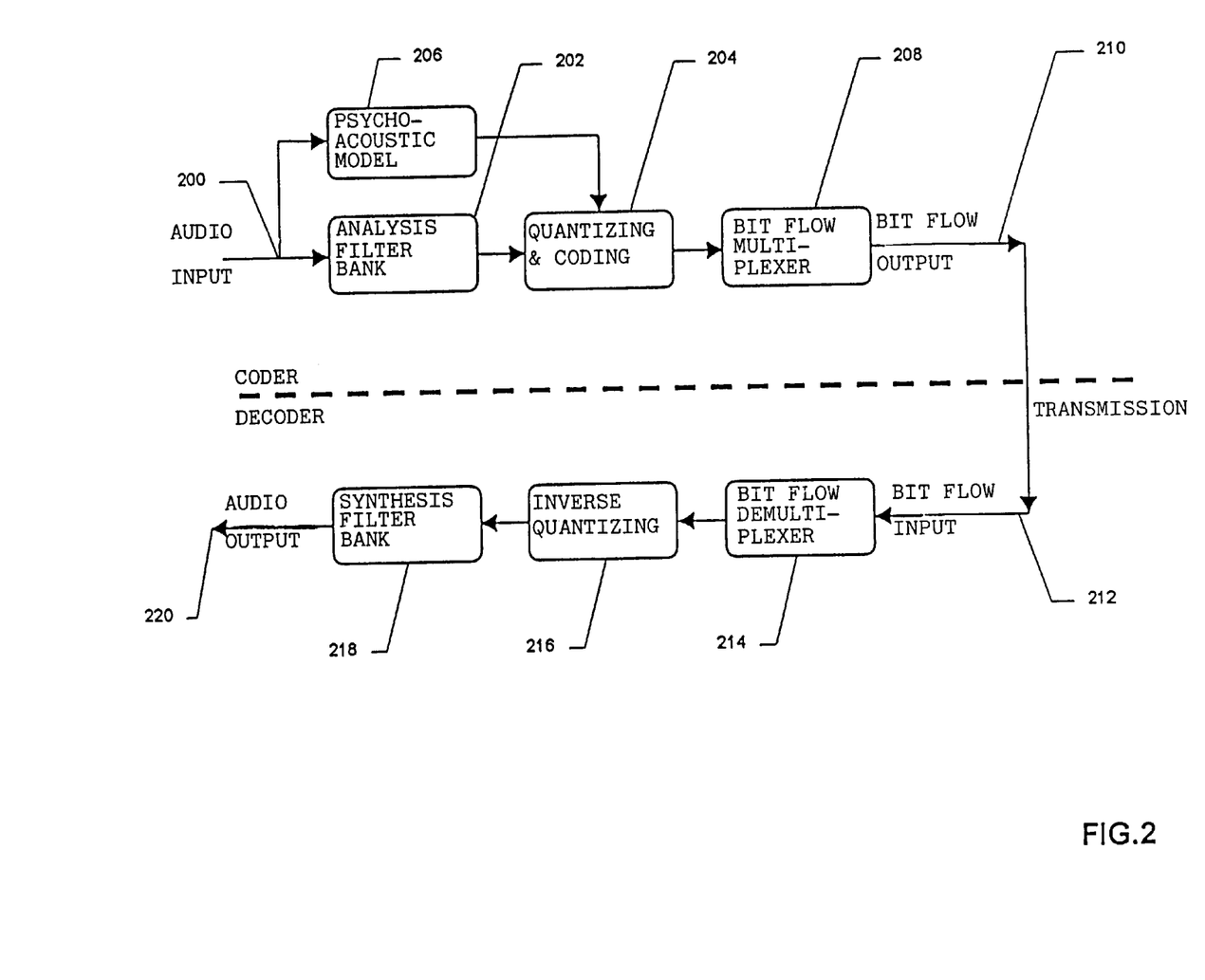
FIG. 2 shows a block diagram illustrating the basic concept of a known coder and decoder.

FIG. 2 shows a general survey of a coder and a decoder operating in accordance with the basic principle described. An audio signal, which preferably is already present in time-discrete manner, is input via an audio input 200. The time-discrete audio signal then is subjected to windowing within a block 202 designated analysis filter bank and having a windowing function, in order to obtain blocks of time-discrete windowed audio signals that are also referred to as "frames". In analysis filter bank 202, the blocks of windowed values are transformed to the frequency range. Thus, there are spectral values appearing at the output of analysis filter bank 202 which are first quantized in a block "quantizing and coding" 204 and then are redundancy-coded, for example, by means of Huffman coding. Furthermore, from the time-discrete audio input signal at audio input 200, masking information used in quantizing is calculated by means of a psychoacoustic model 206, so that the quantization noise introduced for quantizing the spectral values is psychoacoustically masked or covered by the same. The quantized and coded spectral values, in case of the coder, a fed into a bit flow multiplexer 208 forming of the quantized and redundancy-coded spectral values a bit flow, with the bit flow containing furthermore side information necessary for decoding, as is known to experts. The finished, coded bit flow is present at a bit flow output 210, which now constitutes a coded version of the audio signal at audio input 200. This bit flow is transmitted to a decoder and fed into a bit flow input 212 of the same. In bit flow demultiplexer 214, the bit flow is decomposed into side information and quantized and coded spectral values, which are redundancy-coded and requantized in block "inverse quantization" 216, in order to be supplied to a synthesis filter bank 218 which transforms the spectral values present at the input thereof back to the time range, whereupon a coded and decoded audio signal is present at an audio output 220 of the decoder. The coded and decoded audio signal present at audio output 220, with the exception of introduced coding errors, corresponds to the original time-discrete audio signal present at audio input 200.

The so-called "Temporal Noise Shaping" technique also is already known and described in the art (J. Herre, J. D. Johnston, "Enhancing the Performance of Perceptual Audio Coders by Using Temporal Noise Shaping (TNS)", 101st AES Convention, Los Angeles 1996, Preprint 4384). The TNS technique (TNS=Temporal Noise Shaping), generally speaking, permits temporal shaping of the fine structure of quantization noise by means of predictive coding of the spectral values. The TNS technique is based on consequent application of the dualism between time and frequency range. It is known from technology that the auto-correlation function of a time signal, when transformed to the frequency range, indicates the spectral power density of exactly this time signal. The dual case with respect thereto arises when the auto-correlation function of the spectrum of a signal is formed and transformed to the time range. The auto-correlation function transformed to the time range or transformed back therefrom is also referred to as square of the Hilbert envelope curve of the time signal. The Hilbert envelope curve of a signal thus is directly related to the auto-correlation function of its spectrum. The squared Hilbert envelope curve of a signal and the spectral power density thereof thus constitute dual aspects in the time range and in the frequency range. When the Hilbert envelope curve of a signal remains constant for each partial band-pass signal over a range of frequencies, the auto-correlation between adjacent spectral values will be constant as well. This means in fact that the series of spectral coefficients in relation to frequency is stationary, and this is why predictive coding techniques can be used in efficient manner for representing this signal by utilizing a common set of prediction coefficients.

Figure 5A:
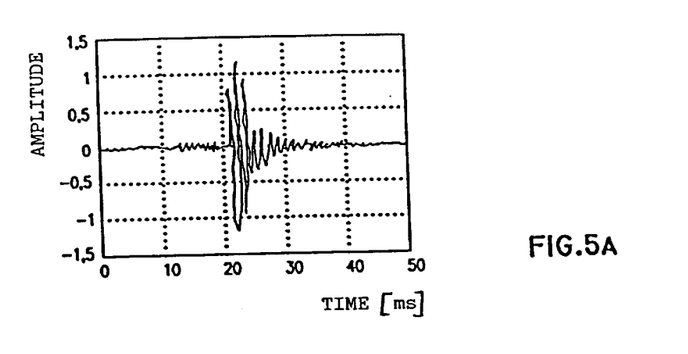
FIG. 5a shows an example of a transient signal.
Figure 5B:
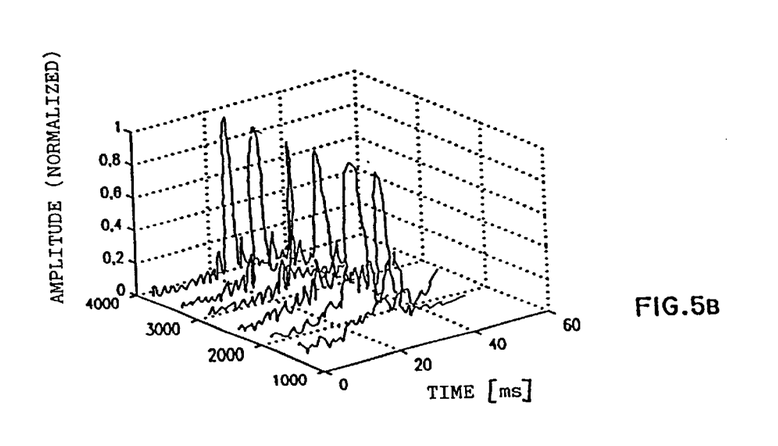

For illustrating these facts, reference is made to FIGS. 5a and 5b. FIG. 5a shows a short section of a "castanet-type" signal of a duration of about 40 ms, which is highly transient in time. This signal was divided into several partial band-pass signals, with each partial band-pass signal having a bandwidth of 500 Hz. FIG. 5 shows the Hilbert envelope curves for these band-pass signals having center frequencies in the range from 1500 Hz to 4000 Hz. For reasons of clarity, all envelope curves have been normalized to their maximum amplitude. The shapes of all partial envelope curves obviously are highly related with each other, and therefore a common predictor can be used within this frequency range for efficiently coding the signal. Similar observations can be made with voice signals in which the effect of the glottal excitation pulses is present over the entire frequency range due to the nature of the human speech forming mechanism.

FIG. 5 thus shows that the correlation of adjacent values, for example, at a frequency of 2000 Hz is similar to that present, for example, at a frequency of 3000 Hz or 1000 Hz, respectively.

Figure 4:
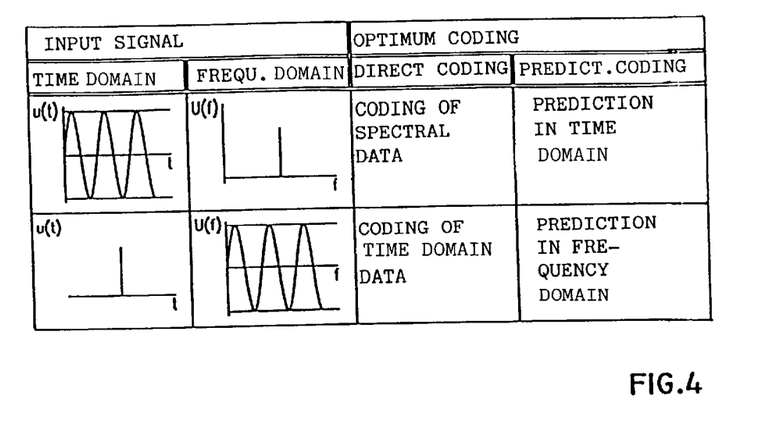
FIG. 4 shows a table for illustrating the duality between the time range and the frequency range.

An alternative way of understanding the property of spectral predictability of transient signals can be obtained from the table shown in FIG. 4. At the upper left of the table, there is depicted a time-continuous signal u(t) having a sinusoidal path. Opposite thereto, there is shown the spectrum U(f) of this signal, which consists of a single Dirac pulse. Optimum coding for this signal consists in coding spectral data or spectral values since, for the entire time signal, only the amount as well as the phase of the Fourier coefficient need to be transmitted for being able to completely reconstruct the time signal. Coding of spectral data at the same time corresponds to prediction in the time range. Thus, predictive coding would have to take place in the time range here. The sinusoidal time signal thus has a flat temporal envelope curve, which corresponds to an envelope curve in the frequency range that is not flat at its maximum.

In the following, the opposite case is to be considered, in which the time signal u(t) is a maximum transient signal in the firm of a Dirac pulse in the time range. A Dirac pulse in the time range corresponds to a "flat" power spectrum, while the phase spectrum is rotating in accordance with the temporal position of the pulse. This signal obviously constitutes a problem for the afore-mention traditional methods, such as e.g. transformation coding or coding of spectral data or linear prediction coding of the time range data. This signal can be coded best and in the most efficient manner in the time range, since only the temporal position as well as the power of the Dirac pulse need to be transmitted, which by consequent application of dualism leads to the result that predictive coding in the frequency range also constitutes a suitable method for efficient coding.

It is very important not to confuse predictive coding of spectral coefficients in relation to frequency with the known dual concept of prediction of spectral coefficients from one block to the next one, which is already implemented and also described in the afore-mentioned article (M. Bosi, K. Brandenburg, S. Quakenbush, L. Fielder, K. Akagiri, H. Fuchs, M. Diets, J. Herre, G. Davidson, Yoshiaki Oikawa: "ISO/IEC MPEG-2 Advanced Audio Coding", 101st AES Convention, Los Angeles 1996, Preprint 4382). In the prediction of spectral coefficients from one block to the next one, which corresponds to a prediction in relation to time, the spectral resolution is increased, whereas a prediction of spectral values in relation to frequency enhances the temporal resolution. A spectral coefficient at 1000 Hz, for example, can be determined by the spectral coefficient, for example, at 900 Hz in the same block or frame.

The considerations outlined thus led to provision of an efficient coding method for transient signals. Predictive coding techniques, in consideration of the duality between time and frequency range, can be treated substantially analogous to the already known prediction from one spectral coefficient to the spectral coefficient of the same frequency in the next block. Due to the fact that the spectral power density and the squared Hilbert envelope curve of a signal are of dual character with respect to each other, a reduction of a residual signal energy or a prediction gain is obtained in accordance with a degree of flatness of the squared envelope curve of the signal in contrast to a degree of spectral flatness in case of the conventional prediction method. The potential coding gain increases with increasingly transient signals.

Possible prediction schemes are both the prediction scheme with closed loop, which is also referred to as backward prediction, as well as the prediction scheme with open loop, which is also referred to as forward prediction. In case of the spectral prediction scheme with closed loop (backward prediction), the envelope curve of the error is flat. In other words, the error signal energy is distributed uniformly in relation to time.

Figure 6:
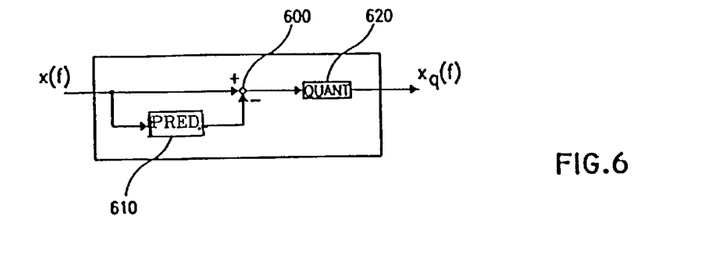
FIG. 6 shows a schematic representation of prediction in the frequency range.

However, in case of forward prediction, as shown in FIG. 6, temporal shaping of the noise introduced by quantization takes place. A spectral coefficient x(f) to be predicted is fed to a summing point 600. The same spectral coefficient, furthermore, is supplied to a predictor 610 whose output signal with negative sign is supplied to summing point 600 as well. The input signal to a quantizer 620 thus represents the difference of the spectral value x(f) and the spectral value $x_p(f)$ calculated by prediction. In forward prediction, the overall error energy in the decoded spectral coefficient data will remain the same. The temporal shape of the quantization error signal, however, will appear to be temporally shaped at the output of the decoder, since the prediction with respect to the spectral coefficients was employed, whereby the quantization noise will be placed temporally under the actual signal and thus can be masked. In this manner, problems of time masking e.g. with transient signals or voice signals, are avoided.

Figure 7A:
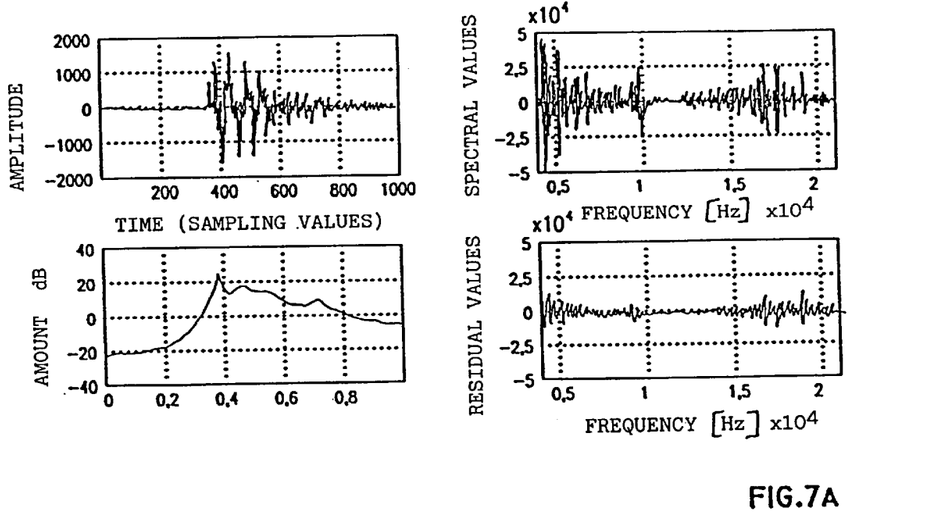
FIG. 7a shows an example for illustrating the TNS method.

This type of predictive coding of spectral values thus is referred to as TNS or temporal noise shaping technique. To illustrate this technique, reference is made to FIG. 7a. To the upper left of FIG. 7a, there is shown a time curve of a highly transient time signal. Confronted with the time curve is the section of a DCT spectrum at the upper right in FIG. 7a. The lower left representation in FIG. 7 shows the resulting frequency response of a TNS synthesis filter that was calculated by LPC operation (LPC=Linear Prediction Coding). It is to be noted that the (normalized) frequency coordinates in this diagram correspond to the time coordinates due to the time range and frequency range duality. The LPC calculation obviously leads to a "source model" of the input signal since the frequency response of the LPC-calculated synthesis filter is similar to the envelope curve of the highly transient time signal. FIG. 7a at the lower right shows a representation of the spectral residual values, i.e. of the input signals of quantizer 620 in FIG. 6, in relation to frequency. A comparison between the spectral residual values after prediction and the spectral values with direct time-frequency transformation shows that the spectral residual values have considerably less energy than the original spectral values. In the embodiment shown, the energy reduction of the spectral residual values corresponds to an overall prediction gain of about 12 dB.

The following is to be noted with respect to the representation at the lower left in FIG. 7a. In case of classical application of prediction for time range signals, the frequency response of the synthesis filter is an approximation of the value spectrum of the input signal. The synthesis filter (re)generates so to speak the spectral shape of the signal from a residual signal having an approximately "white" spectrum. When applying the prediction to spectral signals, as in case of the TNS technique, the frequency response of the synthesis filter is an approximation of the envelope curve of the input filter. The frequency response of the synthesis filter is the Fourier transform of the pulse response, as holds for the classic case, but the inverse Fourier transform. The TNS synthesis filter so to speak (re)generates the envelope curve pattern of the signal from a residual signal having an approximately "white" (i.e. flat) envelope curve. The representation at the lower left in FIG. 7a thus shows the envelope curve of the input signal as modelled by the TNS synthesis filter. This is in the present case a logarithmic representation of the envelope curve approximation of the castanet-type signal shown in the representation thereabove.

Figure 7B:
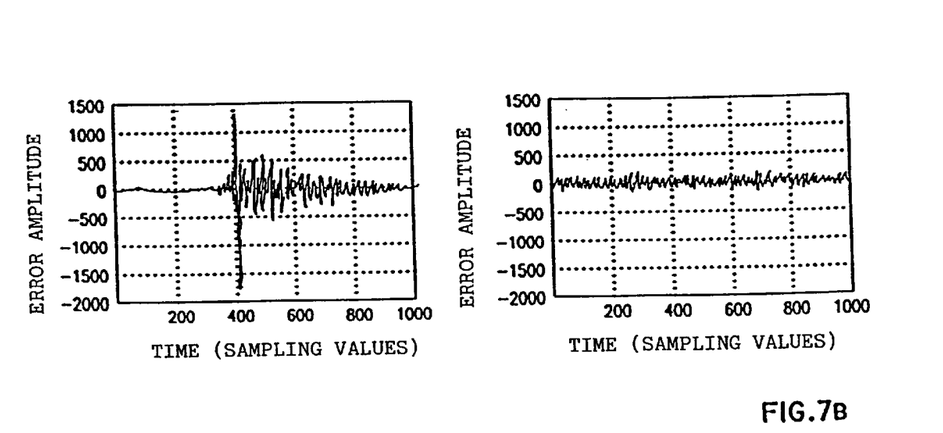
FIG. 7b shows a comparison between the temporal pattern of introduced quantization noise with (on the left-hand side) and without (on the right-hand side) TNS technique.

Thereafter, a coding noise was introduced into the spectral residual values, such that in each coding band having a width of 0.5 Bark, for example, a signal-to-noise ratio of about 13 dB resulted. The error signals in the time range, resulting from introduction of the quantization noise, are shown in FIG. 7b. The left-hand representation in FIG. 7b depicts the error signal due to the quantization noise in case the TNS technique is used, whereas in the right-hand diagram the TNS technique was not used for reasons of comparison. As is expected, the error signal in the left-hand diagram is not distributed uniformly across the block, but concentrates in that portion in which there is also a high signal component present that will cover this quantization noise in optimum manner. In the case shown on the right-hand side, the introduced quantization noise, in contrast thereto, is distributed uniformly in the block, i.e. in relation to time, which has the result that in the forward portion, in which actually no or almost no signal is present, there will also be noise present that will be audible, whereas in the region containing high signal components, relatively little noise will be present through which the masking possibilities of the signal are not fully exploited.

Figure 8A:
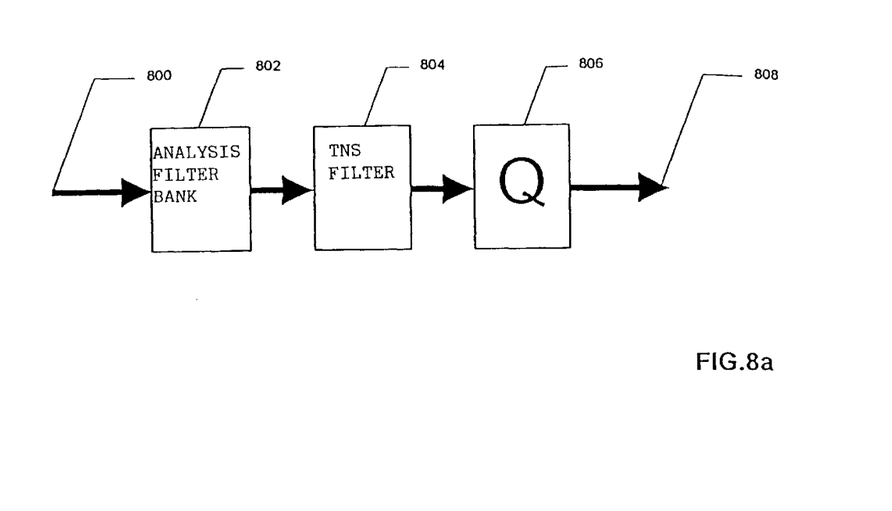
FIG. 8a shows a simplified block diagram of a coder having a TNS filter.
Figure 8B:
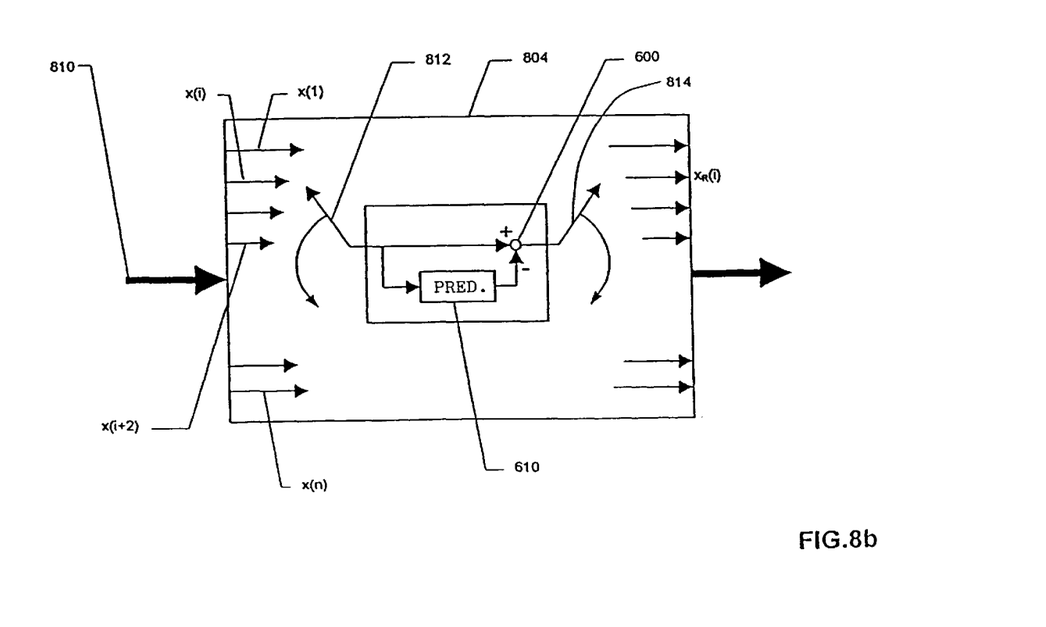

Implementation of a TNS filter 804 in a coder is shown in FIG. 8a. The latter is arranged between an analysis filter bank 802 and a quantizer 806. The time-discrete input signal in case of the coder shown in FIG. 8a is fed to an audio input 800 whereas the quantized audio signal and, respectively, quantized spectral values or the quantized spectral residual values are output at an output 808 which may have a redundancy coder connected downstream thereof. The input signal thus is transformed into spectral values. On the basis of the spectral values calculated, a usual linear prediction calculation is carried out which takes place, for example, by forming the auto-correlation matrix of the spectral values and using a Levinson-Durbin recursion. FIG. 8b shows a more detailed view of the TNS filter 804. The spectral values x(1), . . . , x(i), . . . , x(n) are input at a filter input 810. It may happen that only a specific frequency range has transient signals, whereas another frequency range is rather of stationary nature. This fact is taken into consideration in TNS filter 804 by an input switch 812 as well as by an output switch 814, however, with the switches taking care first of parallel to serial and serial to parallel conversion, respectively, of the data to be processed. Depending on whether a specific frequency range is non-stationary and promises a specific coding gain by the TNS technique, only this spectral range will be TNS-processed, which takes place in that input switch 812 starts for example at the spectral value x(i) and runs e.g. until reaching the spectral value x(i+2). The inner portion of the filter again consists of the forward prediction structure, i.e. the predictor 610 as well as the summing point 600.

The calculation for determining the filter coefficients of the TNS filter and for determining the prediction coefficients, respectively, is carried out as follows. The formation of the auto-correlation matrix and the use of the Levinson-Durban recursion is carried out for the highest admissible order of the noise-shaping filter, e.g. 20. When the prediction gain calculated exceeds a specific threshold, TNS processing is activated.

The order of the noise-shaping filter used for the present block then is determined by subsequent removal of all coefficients with a sufficiently small absolute value from the end of the coefficient array. In this manner the orders of TNS filters usually are in the order of magnitude of 4 to 12 for a voice signal.

When, for a range of spectral values x(i), for example, a sufficiently high coding gain is ascertained, the latter is processed, and not the spectral value x(i), but the spectral residual value $x_R(i)$ is issued at the output of the TNS filter. The latter value has a considerably lower amplitude than the original spectral value x(i), as can be seen from FIG. 7a. The side information transmitted to the decoder thus contains, in addition to the usual side information, a flag indicating the use of TNS and, if necessary, information on the target frequency range and also on the TNS filter used for coding. The filter data can be represented as quantized filter coefficients.

Figure 9A:
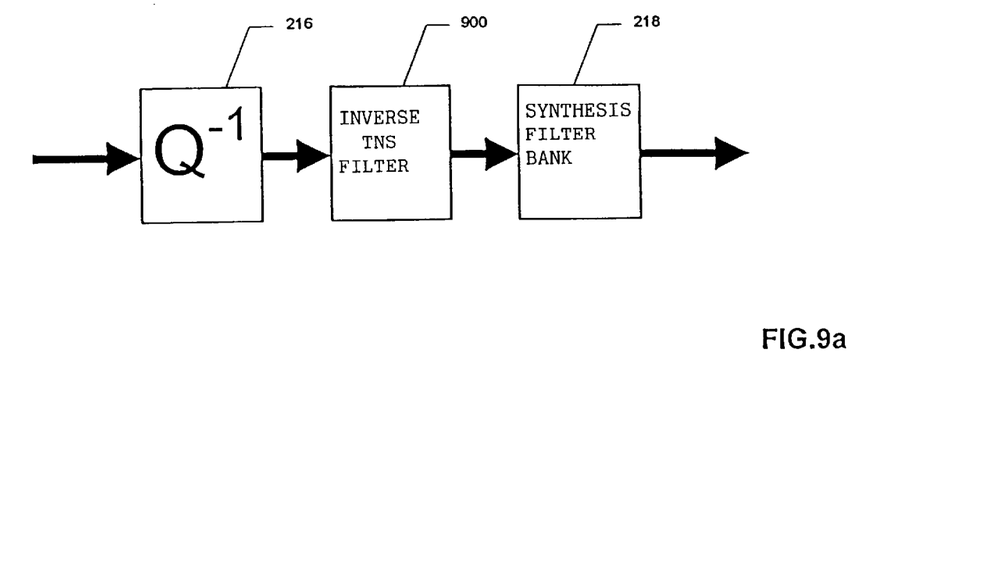
FIG. 9a shows a simplified block diagram of a decoder having an inverse TNS filter.
Figure 9B:
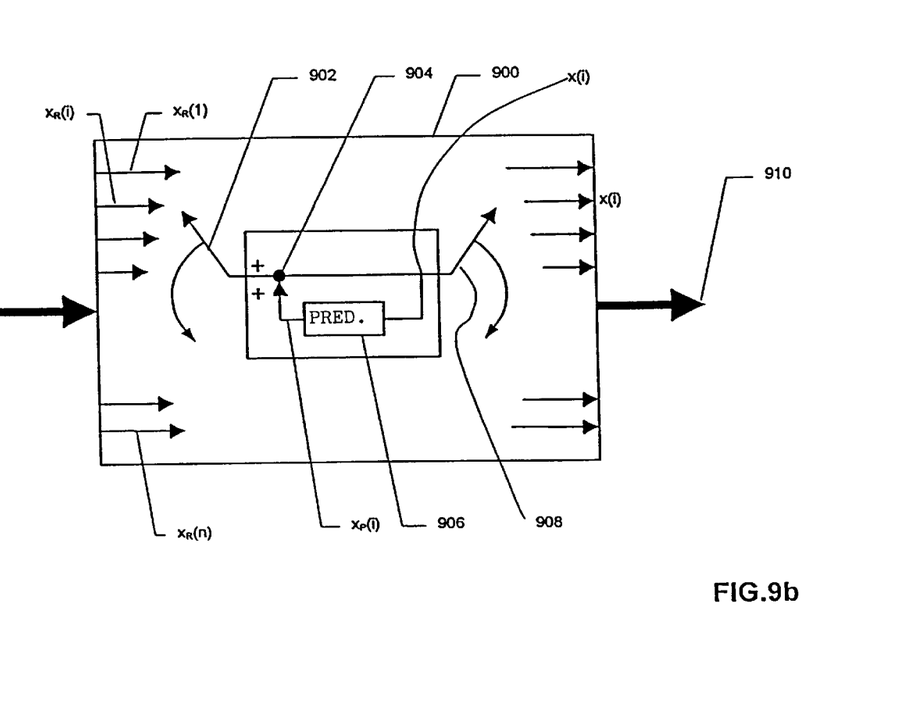

In the decoder outlined in FIG. 9a, TNS coding is reversed for each channel. Spectral residual values $X_R(i)$ are requantized in inverse quantizer 216 and fed to an inverse TNS filter 900 the structure of which is shown in more detail in FIG. 9b. The inverse TNS filter 900 again delivers as output signal spectral values which are transformed to the time range in a synthesis filter bank 218. The TNS filter 900 again comprises an input switch 902 as well as an output switch 908 which firstly serve again for parallel to serial conversion and serial to parallel conversion, respectively, of the data processed. Input switch 902 furthermore takes into account a possibly employed target frequency range in order to supply only spectral residual values to inverse TNS coding, whereas spectral values that are not TNS-coded are allowed to pass to an output 910 without being changed. The inverse prediction filter again comprises a predictor 906 and a summation point 904. However, differently from the TNS filter, they are connected as follows. A spectral residual value is fed via input switch 902 to summation point 904 where it is summed with the output signal of predictor 906. The predictor delivers an estimated spectral value $x^P(i)$ as output signal. The spectral value x(i) is output via the output switch to the output of the inverse TNS filter. The TNS-related side information thus is decoded in the decoder, with the side information comprising a flap indicating the use of TNS and, if necessary, information concerning the target frequency range. In addition thereto, the side information contains furthermore the filter coefficients of the prediction filter that was used for coding a block or "frame".

The TNS method thus can be summarized as follows. An input signal is transformed to a spectral representation by means of a high-resolution analysis filter bank. Thereafter, linear prediction in the frequency range is carried out, namely between the frequency-adjacent spectral values. This linear prediction can be interpreted as filtering process for filtering the spectral values, which is carried out in the spectral range. The original spectral values are thus replaced by the prediction error, i.e. by the spectral residual values. These spectral residual values, just as usual spectral values, are transmitted to the decoder in quantized and coded form, in which the values are decoded again and inversely quantized. Prior to application of the inverse filter bank (synthesis filter bank), a prediction inverse to the prediction carried out in the coder is performed by using the inverse prediction filter for the prediction error signal transmitted, i.e. the requantized spectral residual values.

By application of this method, it is possible to match the temporal envelope curve of the quantization noise to that of the input signal. This permits improved exploitation of the masking of the error signals in case of signals having a pronounced fine structure in terms of time or a pronounced transient nature. In case of transient signals, the TNS method avoids the so-called "pre-echoes" in which the quantization noise appears already prior to "striking" of such a signal.

It is known, furthermore, from the field of psychoacoustics that the impression of perception of noise signals is determined primarily by the spectral composition thereof and not by the actual signal shape thereof. This permits the use of a so-called noise substitution method in the data reduction of audio signals.

The "noise substitution" is described in Donald Schulz: "Improving Audio Codecs by Noise Substitution", Journal of the Audio Eng. Soc., Vol. 44, No. 7/8, pages 593 to 598, July/August 1996. As was already mentioned, conventional audio coding algorithms make use of masking effects of the human ear for significantly reducing the data rate or the number of bits to be transmitted. Masking thus means that one or more frequency components as spectral values make other components of lower levels inaudible. This effect can be exploited in two ways. First, audio signal components masked by other components need not be coded. Second, the introduction of noise is permitted by the afore-described quantization when such noise is masked by components of the original signal.

In case of noise-like signals, the human hearing system is not capable of ascertaining the exact path in time of such a signal. With conventional algorithms, this led to the result that even the waveform of white noise, which is nearly irrelevant for the human ear, was coded. Hearing-compensated coding of noise-containing signals thus requires high bit rates for information that is not audible when there are no specific precautions taken. If, however, noise-containing components of signals are detected and coded along with information on their noise levels, on their frequency range or on their extension in time, such superfluous coding can be reduced, which may lead to extraordinarily high bit savings. This fact is supported by psychoacoustics which says that the impression of perception of noise signals is determined primarily by the spectral composition thereof and not by the actual waveform. This permits thus the utilization of the noise substitution method for the data reduction of audio signals.

The coder thus is confronted with the task of finding or recognizing noise-like or noisy spectral values in the entire spectrum of the audio signal. A definition for noise-like spectral values reads as follows: when a signal component can be characterized by its level, by its frequency range and by its extension in time in such a manner that it can be reconstructed by a noise substitution method without audible differences for the human sense of hearing, this signal component is classified as noise. The detection of this characteristic can be carried out either in the frequency range or in the time range, as pointed out in the publication cited last. The simplest method, for example, consists in detecting tonal, i.e. not noise-like, components by making use of a time-frequency transformation and in following stationary peaks in spectrums following each other in time. These peaks are referred to as tonal, everything else is referred to as noise-like. However, this constitutes are relatively coarse system of noise detection. Another possibility of distinguishing between noise-like and tonal spectral components consists in making use of a predictor for spectral values in successive blocks. A prediction is carried out from one spectrum to the next spectrum, i.e. the spectrum associated with the next temporal block or frame. When there is no or only little difference between a predicted spectral value and a spectral value of the next block or frame in time that has actually been ascertained by transformation, it will be assumed that this spectral value is a tonal spectral component. From this, a measure of tonality can be derived the value of which constitutes a basis for decision for distinguishing tonal and noise-like spectral values from each other. However, this method of detection is suitable only for strictly stationary signals. It does not permit a detection of situations in which sinusoidal signals with slightly varying frequencies in relation to time are present. Such signals often appear in audio signals, such as e.g. vibratos, and it is obvious to the expert that these cannot be replaced by a noise-like component.

Another possibility of detecting noise-like signals consists in noise detection by prediction in the time range. To this end, a matched filter can be used as predictor which can be employed repeatedly for performing a linear prediction, as it is sufficiently known in technology. Passed audio signals are input, and the output signal is compared with the actual audio sampling value. In the case of a minor prediction error, tonality can be assumed. For determining the character of different frequency regions, i.e. for detecting the spectral range, whether a group of spectral values is a noise-like group, time-frequency transformations both of the original signal and of the predicted signal have to be carried out. A measure of tonality can then be calculated for each frequency group by comparing the original and the predicted values with each other. A major problem in this respect is the limited dynamic range of the predictor. A noise-like frequency group of high level dominates the predictor due to the resulting high error. Other frequency regions with tonal components could be interpreted as noise-like. This problem can be reduced by using an iterative algorithm in which the error signal usually is of lower level than the original signal and is again input by an additional predictor, whereupon both predicted signals are added. Further methods are listed in the publication by Schulz.

The group of spectral values that is now classified as noise-like, is not transmitted to the receiver in quantized and entropy- or redundancy-coded form (for example by means of a Huffman table) as is usual. Rather, only an identification for indicating the noise substitution as well as a measure of the energy of the noise-like group of spectral values are transmitted as side information. In the receiver, the substituted coefficients are replaced by random values (noise) along with the transmitted energy. The noise-like spectral values thus are substituted by random spectral values with the corresponding amount of energy.

By transmitting a single item of energy information instead of a group of codes, i.e. several quantized and coded spectral values, for the quantized spectral coefficients, there are considerable data savings possible. It is apparent that the data rate savings attainable are dependent upon the signal. For example, when a signal with very few noise components, i.e. very few noise-like groups, or with transient properties is involved, lower data rate savings will be possible than in case of coding of a very noisy signal having very many noise-like groups.

The initially described standard MPEG-2 Advanced Audio Coding (AAC) does not support the possibility of noise substitution. The considerable data rate savings are thus not possible so far with the presently existing standard.

Figure 3:
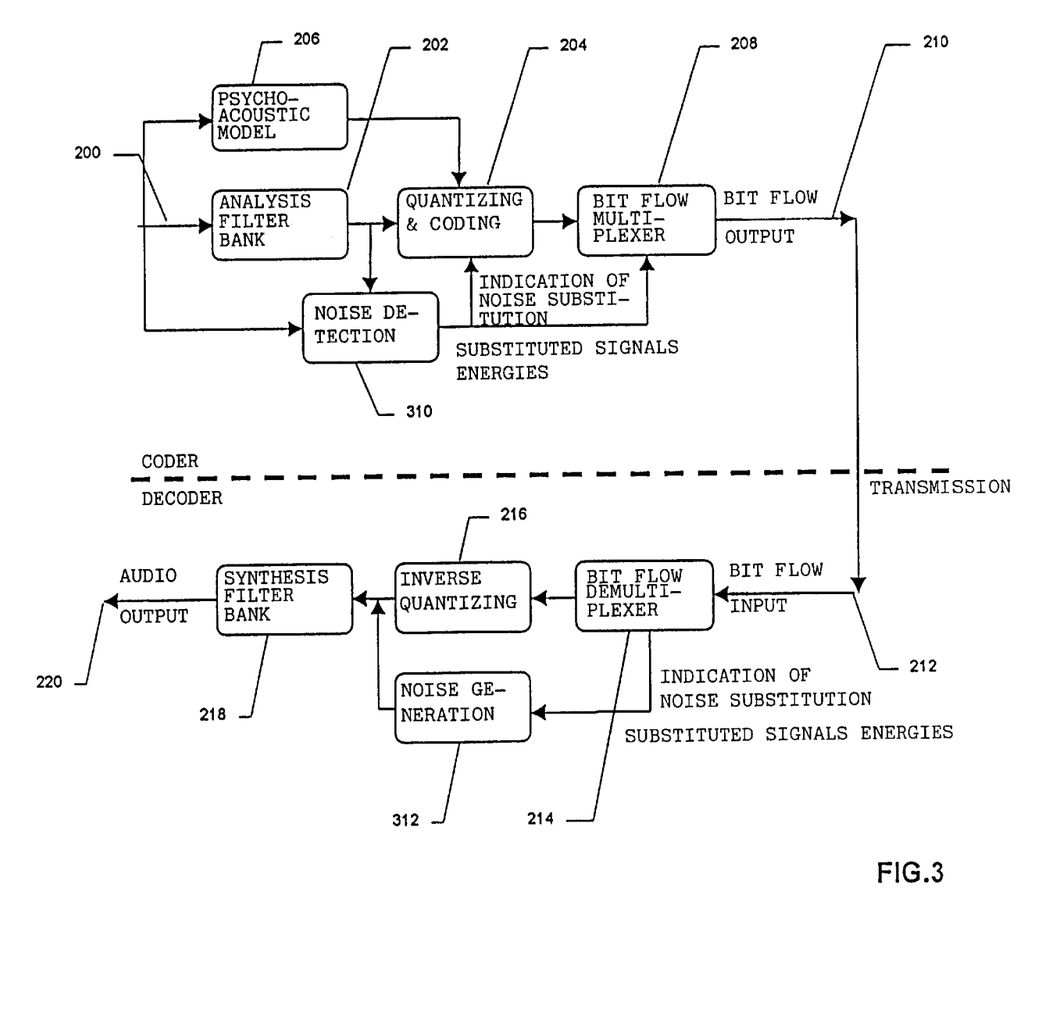
FIG. 3 shows a block diagram of the coder shown in FIG. 2, which is extended by noise substitution.

FIG. 3 again shows a survey of a coder and a decoder, with the coder and decoder in FIG. 3 corresponding to the coder and decoder, respectively, described with regard to FIG. 2, while however containing noise substitution. It is to be emphasized here once more that the implementation of noise substitution as shown in FIG. 3 is not part of the prior art, as was already pointed out in the preceding paragraph. Like reference numerals refer to like functional blocks. It can thus be seen that the coder in FIG. 3 merely has one new block "noise detection" 310 in comparison with FIG. 2. The noise detection is carried out with the output signals, i.e. the spectral values, of the analysis filter bank 202. However, it is also possible to use for noise detection the temporal input signals of the analysis filter bank, as indicated by the arrow symbol connecting the audio input 200 to the block "noise detection" 310. Noise substitution requires two categories of side information, as indicated by the two arrows extending from the block "noise detection" to the block "quantizing and coding" 204 and, respectively, from the block "noise detection" 310 to the block "bit flow multiplexer" 208. In order to be able to decode again a noise-substituted coded signal, a noise substitution indication has to be transmitted as side information, which indicates in which frequency range or, in a preferred method, in which scale factor band a noise substitution has been carried out. Furthermore, the measure for the energy of the spectral values in the noise-like group or the noise-like scale factor band also has to be transmitted as side information. It is to be pointed out here that noise-substituted spectral values are not quantized and coded, i.e. the block "quantizing and coding" 204 is informed that noise substitution is present in a scale factor band. The bit flow multiplexer also receives the noise substitution indication and, as side information, the measure of the energy of the spectral values in a noise-like group.

The decoder also is similar to the already described decoder of FIG. 2, with the exception of the new block "noise substitution" 312. Block "noise substitution" 312 receives as input signals from bit flow demultiplexer 204 the side information containing noise substitution indication and the energies of the substituted signals, i.e. the measure of the energy of the spectral values in a noise-like group and in a noise-like scale factor band, respectively. The block "noise substitution" generates for the noise-like groups and noise-like scale factor bands, respectively, random or "noise" spectral values which are fed to synthesis filter bank 218 in order to obtain again a coded and decoded time-discrete audio signal. It is obvious that it is irrelevant for the synthesis filter bank 218 whether it transforms noise spectral values or "normal" requantized spectral values to the time range.

The known noise substitution method involves the problem that parts of the input signal can be substituted by noise and then can be decoded again with inaudible quality losses when the input signal exhibits a uniform noise structure, i.e. a plane or flat spectrum. This does not hold in case of transient signals or voice signals, so that either the use of noise substitution has to be dispensed with completely or, in case noise substitution is employed nevertheless, disturbing distortions of the signal are caused.

SUMMARY OF THE INVENTION

It is the object of the present invention to provide a method of coding and decoding audio signals, respectively, which renders possible a high coding efficiency while entailing, if possible, no audible signal distortions.

In accordance with a first aspect of the present invention, this object is met by a method for coding an audio signal, comprising the steps of transforming a temporal audio signal to the frequency domain in order to obtain spectral values of the temporal audio signal; performing a prediction of the spectral values in relation to frequency in order to obtain spectral residual values; detecting noise areas in the spectral residual values; noise-substituting the spectral residual values in the noise areas; and introducing information concerning the noise areas and the noise-substitution in side information of a coded audio signal.

In accordance with a second aspect of the present invention, this object is met by a method for decoding a coded audio signal, comprising the steps of receiving the coded audio signal; detecting information in the side information that relates to noise substitution and to noise areas of the spectral residual values; generating spectral noise residual values on the basis of the detected information in the noise areas; performing an inverse prediction in relation to frequency in order to obtain spectral values from the noise-substituted spectral noise residual values; and transforming the spectral values to the time domain in order to obtain a decoded audio signal.

The present invention is based on the realization that a corresponding combination of TNS technique and noise substitution yields a further increase in coding gain without audible signal distortions. The spectral residual values created by TNS processing have of their own a considerably lower energy content than the original spectral values. The signal belonging to the spectral residual values has a considerably flatter path in comparison with the original signal. By prediction of the spectral values in relation to frequency, the highly fluctuating pattern of the envelope curve of transient signals is so-to-speak extracted, whereby a signal having a flat envelope curve is left to which noise substitution can be applied in accordance with the invention, in order to be able to achieve considerable bit savings in case of transient signals as well.

BRIEF DESCRIPTION OF THE DRAWINGS

A preferred embodiment of the present invention will be described in more detail in the following with reference to the accompanying drawings wherein

FIG. 5b shows Hilbert envelope curves of partial band-pass signals on the basis of the transient time signal depicted in FIG. 5a;

FIG. 8b shows a detailed view of the TNS filter of FIG. 8a;

FIG. 9b shows a detailed representation of the inverse TNS filter of FIG. 9a.

DETAILDE DESCRIPTION OF PREFERRED EMBODIMENTS

Figure 1:
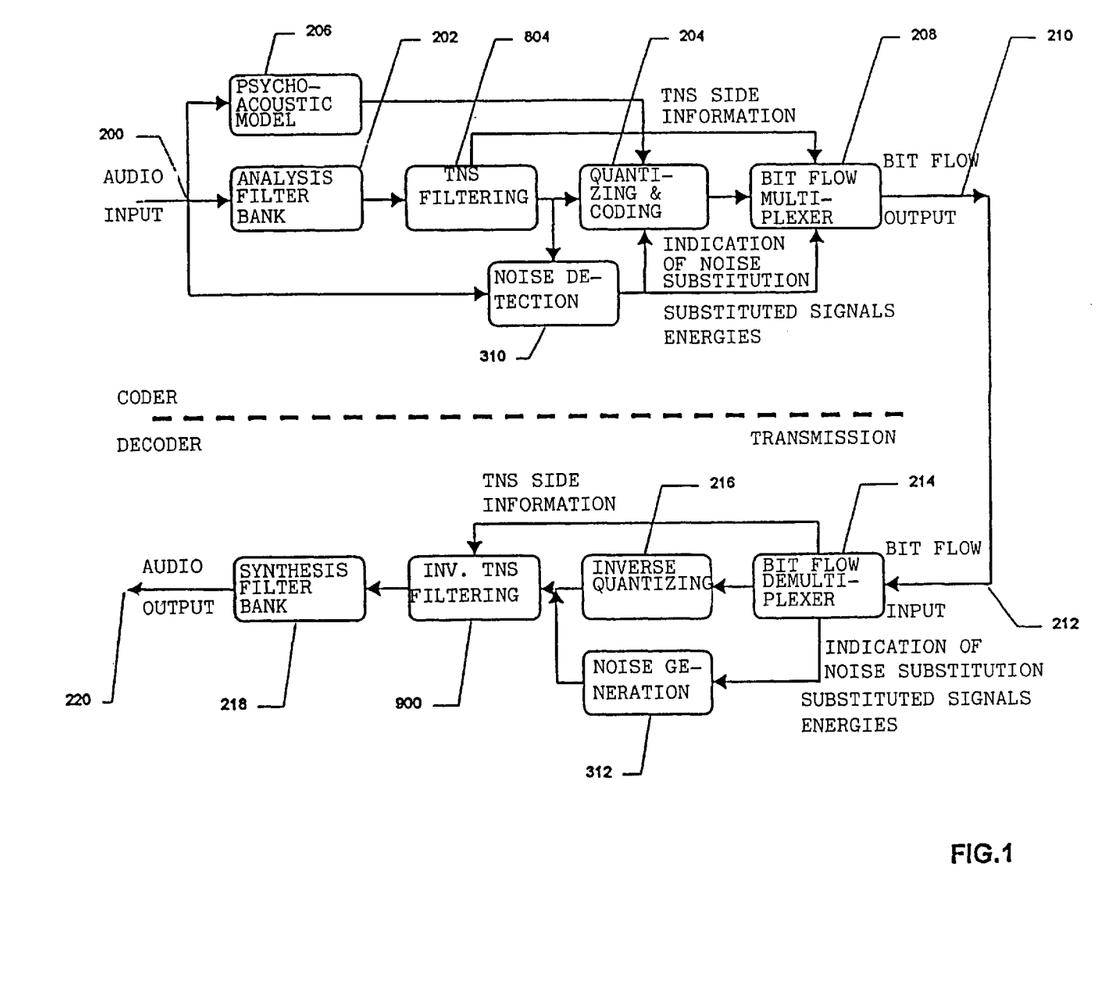
FIG. 1 shows a block diagram of a coder and a decoder according to the present invention.

FIG. 1 shows a coder and a decoder according to the present invention. In comparison with the coder described in FIG. 3, the coder according to the invention, as shown in FIG. 1, contains a combination of TNS filtering and noise substitution. In contrast to the known coder, which performs noise substitution of spectral values, the coder shown in FIG. 1 additionally carries out noise substitution of the spectral residual values at the output of TNS filter 804. In groups of spectral residual values or scale factor bands with spectral residual values, the noise substitution ascertains a measure of the energy of the spectral residual values in a group or in a scale f actor band, and a noise substitution indication to quantizer and coder 204 as well as to bit flow multiplexer 208 is carried out analogously with noise substitution for original spectral values.

In the decoder, the opposite, analogous process takes place. Bit flow demultiplexer 214 supplies TNS side information to the inverse TNS filter. This TNS side information, as already pointed out at several locations herein, comprises the prediction coefficients and filter coefficients, respectively, of the TNS filter, an indication with respect to the target frequency range in case TNS-processing was carried out in frequency-selective manner, as well as a flag indicating where the TNS technique was activated and where not.

Furthermore, the noise substitution indication as well as the measures of the energies of the substituted spectral values or of the spectral residual values in the corresponding scale factor bands are fed from the bit flow demultiplexer to noise generation block 312. Noise generation block 312, irrespective of whether noise-substituted spectral values or noise-substituted spectral residual values are involved, generates noise spectral values which are input to inverse TNS filter 900. The inverse TNS filter allows spectral values that are not TNS-processed, be they of tonal nature or be they noise spectral values, to pass in unchanged manner. In contrast thereto, spectral residual values again are TNS-reprocessed so that synthesis filter bank 218 can output a coded and again decoded time-discrete output signal at audio output 220.

In the following, the noise detection shall be dealt with in a comparison between spectral values and spectral residual values. As was already mentioned at the beginning, the Schulz publication indicates several methods of detecting noise areas in spectral values. These methods can be based alone on the spectral values proper or also on the time-discrete audio signal alone or both on the time-discrete audio signal and on the spectral values of the time-discrete audio signal. This is indicated in FIG. 1 as well as in FIGS. 2 and 3 by the arrow symbol connecting audio input 200 to the block "noise detection".

The method according to the present invention can be summarized as follows. In the coder, the temporal fine structure of the signal is "taken out" by TNS filtering. The residual spectrum or the spectral residual values thus correspond to a version of the time-discrete audio signal at the input of the coder that has been "equalized" in terms of amplitude, with the residual spectrum, which includes the spectral residual values, having an approximately constant envelope structure. The information on the original envelope curve path is contained in the filter coefficients of the TNS filter obtained by linear prediction, with this information being transmitted to the decoder as side information.

The residual spectrum comprising the residual spectral values and being approximately constant in time can now be subjected to noise substitution in analogy with noise substitution for spectral values that are not TNS-processed. Corresponding side information (indication of the substituted frequency bands and band energies) is transmitted to the decoder as side information. In the decoder, the known decoding process takes place for not noise-substituted and noise-substituted frequency bands. The noise introduced by noise substitution has no temporal fine structure, and it thus has an about flat temporal envelope curve. During subsequent inverse TNS filtering, the original time fine structure is introduced again into the signal in accordance with the TNS side information transmitted, before the spectral values are transformed again to the time range by means of the synthesis filter bank.

The combination of the method steps of noise substitution and "Temporal Noise Shaping" thus permits improved noise substitution which can also be employed in efficient manner for signals having a temporal fine structure, with the quantization noise introduced due to the TNS method being temporally shaped and thus packed "under" the temporal signal.

What is claimed is:

1. A method for coding an audio signal, comprising the following steps:
    transforming a temporal audio signal to the frequency domain in order to obtain spectral values of the temporal audio signal;
    performing a prediction of the spectral values in relation to frequency in order to obtain spectral residual values;
    detecting noise areas in the spectral residual values;
    noise-substituting the spectral residual values in the noise areas; and
    introducing information concerning the noise areas and the noise-substitution in side information of a coded audio signal.

2. The method of claim 1, wherein the prediction or inverse prediction, respectively, is carried out only for a specific range of the spectral values.

3. The method of claim 1, wherein a hint that prediction was used, prediction coefficients and, optionally, frequency range information for the prediction are contained in the side information of the coded audio signal.

4. The method of claim 1, wherein filter coefficients generated by prediction are introduced into side information of the coded audio signal.

5. The method of claim 1, wherein the noise substitution is carried out in the form of scale factor bands.

6. The method of claim 1, wherein the step of noise substitution comprises calculating of the energy of the spectral residual values in a detected noise area having a scale factor band, the information contained in the side information of the coded audio signal and concerning noise substitution being contained at the location provided in the bit flow for the scale factor(s) for the one scale factor band and comprising the energy of the error residual values in a corresponding noise area.

7. The method of claim 1, wherein, during coding, the spectral residual values not located in noise areas are quantized in consideration of psychoacoustic masking, and wherein, during decoding, the quantized spectral residual values not located in noise areas are requantized and then subjected to inverse prediction in order to obtain the spectral values.

8. A method for decoding a coded audio signal, comprising the following steps:
    receiving the coded audio signal;
    detecting information in the side information that relates to noise substitution and to noise areas of the spectral residual values;
    generating spectral noise residual values on the basis of the detected information in the noise areas;
    performing an inverse prediction in relation to frequency in order to obtain spectral values from the noise-substituted spectral noise residual values; and
    transforming the spectral values to the time domain in order to obtain a decoded audio signal.

9. The method of claim 8, wherein the prediction or inverse prediction, respectively, is carried out only for a specific range of the spectral values.

10. The method of claim 8, wherein a hint that prediction was used, prediction coefficients and, optionally, frequency range information for the prediction are contained in the side information of the coded audio signal.

11. The method of claim 8, wherein filter coefficients generated by prediction are introduced into side information of the coded audio signal.

12. The method of claim 8, wherein the noise substitution is carried out in the form of scale factor bands.

13. The method of claim 8, wherein the step of noise substitution comprises calculating of the energy of the spectral residual values in a detected noise area having a scale factor band, the information contained in the side information of the coded audio signal and concerning noise substitution being contained at the location provided in the bit flow for the scale factor(s) for the one scale factor band and comprising the energy of the error residual values in a corresponding noise area.

14. The method of claim 8, wherein, during coding, the spectral residual values not located in noise areas are quantized in consideration of psychoacoustic masking, and wherein, during decoding, the quantized spectral residual values not located in noise areas are requantized and then subjected to inverse prediction in order to obtain the spectral values.

* * * * *